(12) United States Patent
Kunz et al.

(10) Patent No.: US 6,996,482 B2
(45) Date of Patent: Feb. 7, 2006

(54) DEVICE AND METHOD FOR DETERMINING THE POSITION OF A ROTOR

(75) Inventors: Olaf Kunz, Grasellenbach (DE); Gerhard Froehlich, Gerlingen (DE); Viktor Barinberg, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/416,636

(22) PCT Filed: Nov. 15, 2001

(86) PCT No.: PCT/DE01/04260

§ 371 (c)(1),
(2), (4) Date: Oct. 23, 2003

(87) PCT Pub. No.: WO02/41468

PCT Pub. Date: May 23, 2002

(65) Prior Publication Data

US 2004/0073389 A1     Apr. 15, 2004

(30) Foreign Application Priority Data

Nov. 16, 2000  (DE) ............................... 100 56 879

(51) Int. Cl.
*G06F 19/00*     (2006.01)
(52) U.S. Cl. ........................... 702/65; 702/71; 702/89; 318/437; 324/137; 331/24; 331/25; 341/111; 341/112

(58) Field of Classification Search ............ 702/64–66, 702/71, 74, 79, 89, 94, 150, 151; 318/437, 318/138; 324/137; 331/24, 25; 341/111, 341/112
See application file for complete search history.

(56) References Cited

U.S. PATENT DOCUMENTS

| 5,365,153 A | * | 11/1994 | Fujita et al. | ................ 318/34 |
| 5,739,659 A | * | 4/1998 | Ezuka | ................ 318/605 |
| 5,767,635 A | * | 6/1998 | Steffens et al. | ................ 318/85 |

OTHER PUBLICATIONS

Auckland elt al., 'The Measurement of Transient Changes in Rotor Angle of a Microsynchronous Alternator', 1981, The Institute of Physics, vol. 14, pp. 51-52.*
Kosaka et al., 'Torque/Current Ratio Improvement of Reluctoance Motor under Consideration of Teeth Design and Current Waveform', 1997, IEEE Article, pp. 661-666.*

(Continued)

*Primary Examiner*—Marc S. Hoff
*Assistant Examiner*—Elias Desta
(74) *Attorney, Agent, or Firm*—Michael J. Striker

(57) ABSTRACT

The invention relates to a device and a method for determining an electrical starting rotor angle of an electromotor. According to the invention, the electromotor (10) is subjected to an approximately sinusoidal voltage and the corresponding current path (i) that is established is then detected. The electromotor (10) is again subjected to an approximately sinusoidal voltage and again, the corresponding current path (i) is detected. A ratio of a measure of the fundamental wave (I1) and the measure of the first harmonic wave (I2) is then determined from the current paths (i) as a measure of the electrical starting rotor angle (δ).

9 Claims, 4 Drawing Sheets

OTHER PUBLICATIONS

Joohn Sheok Kim and Seung Ki Sul : "New Stand-Still Position Detection Strategy . . . ", IEEE 1994, pp. 364369.

Brunotte, et al: :Detection of the Starting Rotor Angle . . . , EPE 1997, pp. 1250-1253.

N. Locci et al: "Rotor Position Detection . . . " ELROMA-92, Technical Papers of the Third International Conference on Electrical Rotating Machines, Bombay, India Jan. 15-16, 1992, pp. VIA-60-VIA67.

* cited by examiner

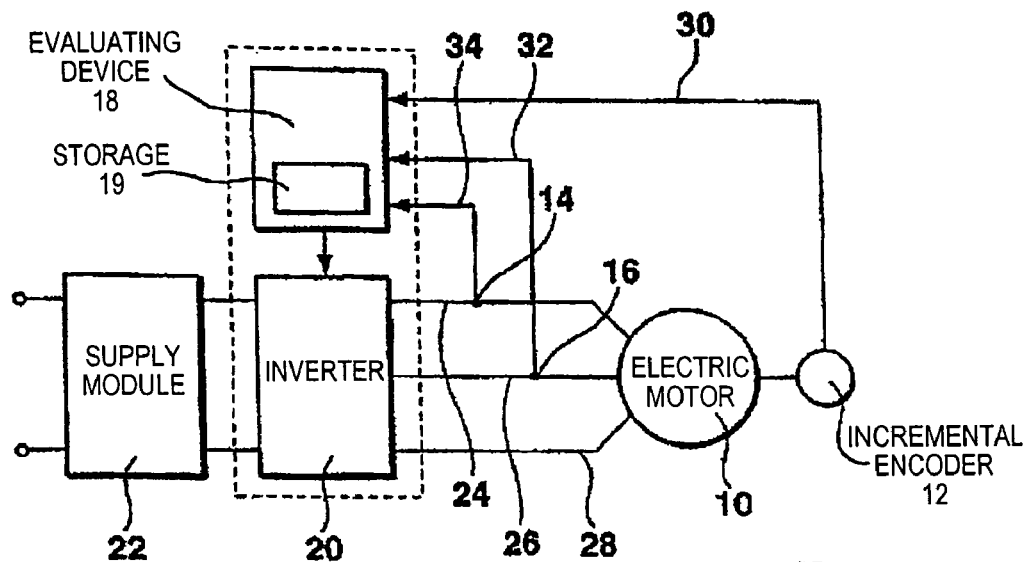
Fig.1
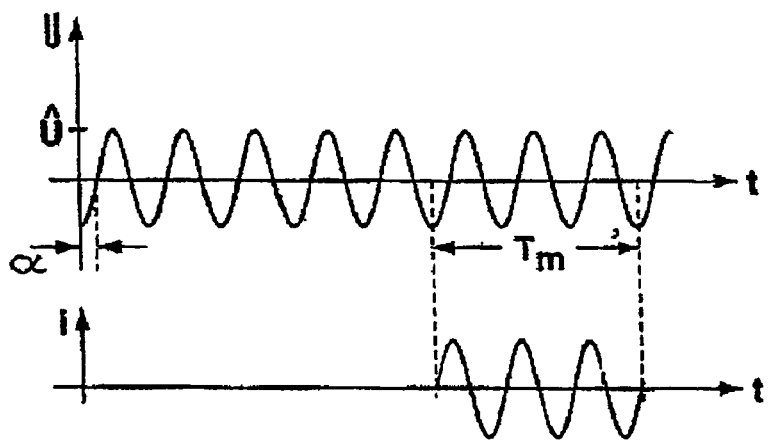
Fig.4a
Fig.4b
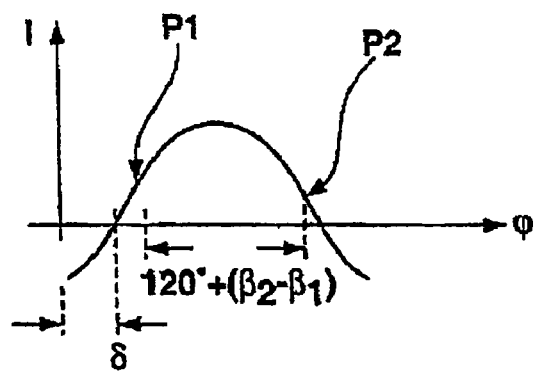
Fig.5

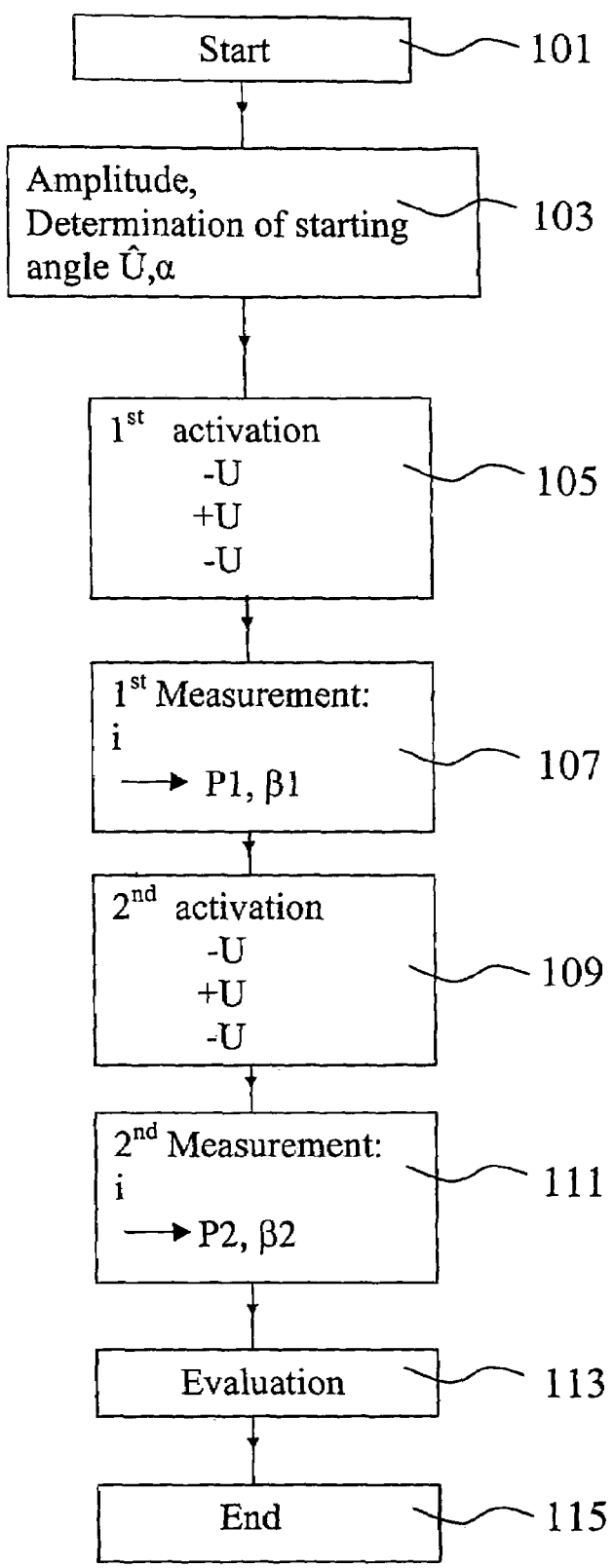

DEVICE AND METHOD FOR DETERMINING THE POSITION OF A ROTOR

BACKGROUND OF THE INVENTION

The invention proceeds from a device and a method for determining the electrical start rotor angle from the generic type of independent claims. In the article "Detection of the starting rotor angle of a pmsm at standstill", C. Brunotte, W. Schumacher, EPE/97, pages 1250 to 1253, a procedure for determining the electrical starting rotor angle is described. For this purpose, a permanent-magnet synchronous motor is subjected to a sinusoidal current of 500 Hz. To determine the electrical rotor angle, the spectrum is detected from an established current. From the saturation effects and the resulting asymmetries of the current path, the position of the coil-equipped stator of the synchronous motor in respect of the rotor equipped with permanent magnets can be determined. For example by way of a Fast-Fourier transformation, the coefficient of the second harmonic of the spectrum is determined from the measured current path. This coefficient of the second harmonic is then a measure of the electrical rotor angle.

SUMMARY OF THE INVENTION

The method and device according to the invention are characterized in that from the spectrum of the measured variable, the fundamental wave (first harmonic) and the (second) harmonic wave am determined and brought into a ratio to each other as a measure for the starting rotor angle of the electric motor, preferably a synchronous motor. Here, it is proved to be especially favorable in the determination of the starting rotor angle to divide the first harmonic by the third power of the fundamental wave. This allows for improved consideration above all of asymmetries attributable to the motor constructions. This has a positive effect on the accuracy of the determination of the starting rotor angle.

An alternative embodiment provides for subjection of the electric motor to a sinusoidal voltage. Thus, the inverter controlling the electric motor acts as a voltage generator. Amplitude and starting phase angle of the voltage to be injected can easily be adjusted to the respective motor. On the one hand, the selected voltage allows for heavy current to simplify detecting of the measured values, while on the other hand disallowing any motor motion at this point to prevent undefined approaching. The amplitude of the voltage preferably depends on the nominal motor current, motor inductivity, or respectively the reactance of motor inductivity. The injected voltage results in significantly better usable signals for evaluation than injected current.

In a useful further development, it is suggested to subject the electric motor for a certain period of time to a sinusoidal voltage, while detecting the measurable variable for further processing not directly at the start, but rather towards the end of the injection process. For example, is the electric motor fed with eight sinusoidal oscillations at 500 Hz, only the last three oscillation periods of the resulting current are evaluated for spectral analysis, but not the first five oscillations. By selective blanking out of transient phenomena, the quality of the measurement can be improved further.

In another useful further development, it is suggested to detect the measurable variables at least twice to determine the amplitudes of the fundamental wave and the first harmonic. In the second detecting process, the electric motor is subjected to a different electrical angle than in the first activation. A minimum of two measuring processes is necessary to determine the starting rotor angle in an unambiguous way by computation.

In another useful further development, it is suggested to collect the spectral information from at least three measurable variables. As in this case, at least one measurable variable is not mandatory for determining the starting rotor angle, measured values can be filtered for example by the method of the least squares. Accordingly, the quality of angle determination can be improved further.

In another useful further development, an incremental encoder is provided which registers the motor movements. The signals of the incremental encoder are detected between the at least two measuring processes and considered in the determination of the electrical starting rotor angle. Thus, the electrical starting rotor angle can be determined with highly accurate results for an electric motor which moves during measuring.

For other useful further developments, refer to the other ensuing Claims and the Description.

BRIEF DESCRIPTION OF THE DRAWINGS

By way of example, one embodiment is shown in the drawings and described in the following.

FIG. 1 shows a block diagram of an structure for determining the electrical stating rotor angle;

FIG. 4a shows the time-dependent path of the injected voltage;

FIG. 4b, the detected current path in a time-dependent fashion;

FIG. 5 shows in greater detail the relation of the first harmonic wave to the third power of the fundamental wave, depending on the electrical rotor angle; and FIG. 6 shows a flow chart of the method for determining the electrical starting rotor angle.

DETAILED DESCRIPTION OF THE PREFERRED EMBODIMENTS

Figure 2:
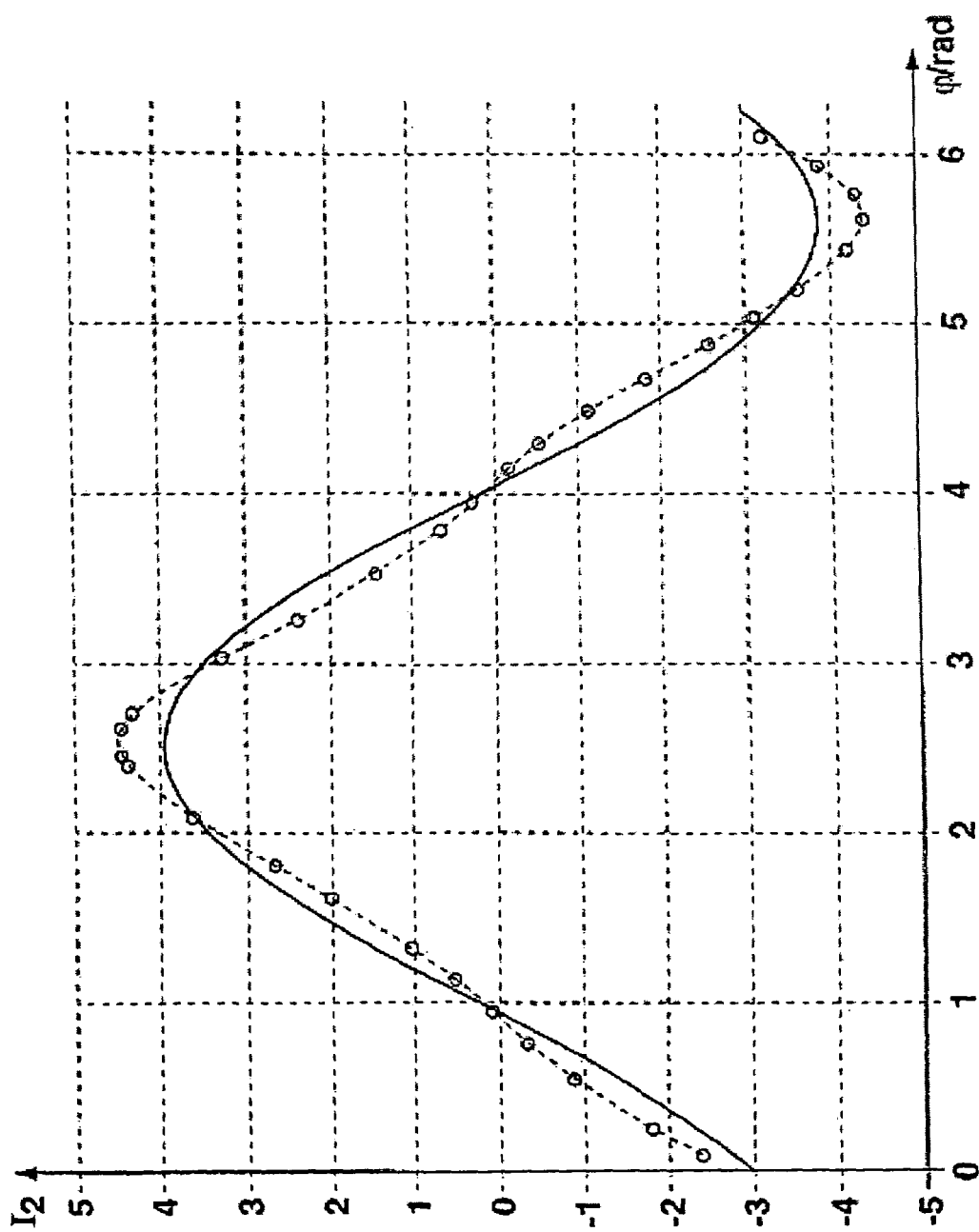
FIG. 2 shows the path of the first harmonic wave 12 of the current, depending on the state-of-the-art electrical rotor angle.

As shown in FIG. 1, rotation of an electric motor 10 is detected by an incremental encoder 12 whose incremental encode signal 30 is transmitted to an evaluating device 18. From a direct voltage of a d.c. link, provided by a supply module 22, an inverter 20 generates approximately sinusoidal voltages or currents, to which a first, a second, and a third phase 24, 26, 28 of the electric motor 10 are subjected. The current flowing through the first phase 24 is detected by a first current sensor 14; the current flowing through the second phase 26, by a second current sensor 16; these currents are transmitted to the evaluating device 18 as a first current value 32 and a second current value 34. A storage 19 is arranged in the evaluating device 18. The evaluating device 189 drives the inverter 20.

A permanent-magnet synchronous motor is preferably used as electric motor 10. The determination of the electrical starting rotor angle is required for selective driving of the motor 10 to achieve traveling in the desired direction of approach. In the described embodiment, it is possible above all to do without an absolute-value generator.

The method for determining the electrical starting rotor angle is explained in greater detail in connection with FIG. 6. In step 101, a respective activation signal is transmitted to the evaluating device 18 to start the procedure for determination of an electrical starting rotor angle δ. In step 103, the voltage amplitude Û and the starting phase angle α are determined as parameters for the approximately sinusoidal voltage to be injected by the inverter 20. The parameters of the voltage to be injected, i.e. the amplitude Û and the starting phase angle α, can easily be determined depending on the motor 10 to be driven in each case. For this purpose, motor-specific characteristics as e.g. maximum current IN, motor winding inductivity L, as motor resistance r are used. These motor-specific characteristics L, r, IN can for example be stored in the storage 19, or registered in an electronic type label at the motor, to be transmitted to the evaluating device 18 in connection with the starting process, step 101. From the motor-specific characteristics L, r, IN, the evaluating device 18 computes the voltage amplitude Û for example by way of the following formula:

$$\hat{U} = \sqrt{2} IN \cdot \sqrt{r^2 + (L \cdot \omega)^2},$$

ω being the angular frequency 2 πf with an oscillation of for example f=500 Hz.

The starting phase angle α is determined according to the following formula:

$$\alpha = \arctan\left(\frac{\omega L}{r}\right).$$

This starting phase angle α indicates the angle α in which to start the sinusoidal voltage U which is to be injected in order to minimize transient phenomena, as indicated for example in FIG. 4a. The dimension of the voltage U to be injected which is given as an example results on a relatively high current i on the one hand, which, however, does not yet trigger a motion of the motor 10 on the other hand. The reason for this is that the injection of a relatively large voltage amplitude Û ensures that the saturation region of the iron is reached in which the non-linearities to be evaluated will occur. On the other hand, however, the voltage U is dimensioned in such a way that generally, the maximum motor current IN is not exceeded. Evaluation can be performed especially easily by injecting a voltage U as the required current sensors are available. However, the measuring principle, as described in State-of-the-Art, could also be realized with a current to be injected.

Now, the evaluating unit 18 drives the inverter 20 in such a way that it puts out a sinusoidal voltage U for example of a frequency of 500 Hz with the amplitude Û and the starting phase angle α. In the first activation according to step 105, the first phase 24 is for example subjected to the sinus voltage shown in FIG. 4a, while each of the second and third phases 26, 28 are supplied with respectively inverted voltage values. This activation according to step 105 is for example maintained for eight sinus oscillations. Generally, the activation period is to be selected in such a way that the measuring times for the subsequent current measuring are outside of the transient phenomena. According to FIG. 4, we proceed on the assumption that after five periods of the injected voltage U, the transient phenomena have died down so far that the current path of the emerging current I can be registered within the measuring time tm in the remaining three periods.

If required, the current path I shown in FIG. 4b, which is generated by the injected voltage U, is sampled, detected, and transmitted to the evaluating unit 18 for example by the first current sensor 14. Furthermore, the evaluating unit 18 detects the incremental encoder signal 30 with a corresponding starting value β1. This is above all to take into consideration a motor 10 which may travel between the two measuring processes (step 107, step 111). From the detected current path I, as shown for example in FIG. 4b, the evaluating unit 18 determines the spectrum, primarily the amplitude of the fundamental wave I1 and the amplitude of the first harmonic I2 of the respective spectrum of the current. Here, the fundamental wave is interpreted as the excitation frequency of the voltage U to be injected, for example 500 Hz; the first harmonic is interpreted as double the excitation frequency (2×500 Hz). This can be done for example by means of the known Fast-Fourier transformation, or the algorithms described in the State-of-the-Art. On application of the following formula, this results in a first value P:

$$I = I2:(I1)^3,$$

I1 being the fundamental wave, and I2 the first harmonic of the current path i.

To determine a sinusoidal curve unambiguously according to FIG. 5, however, a second measurement is required the evaluation of which supplies the second point P2.

This second activation according to step 109 is now performed for example with a different field angle than the one used in the first measurement, e.g. an angle of 120°. The sinusoidal voltage to be injected keeps the parameters Û and α determined in step 103. Now, however, the second phase 26 is subjected to the sinusoidal voltage shown in FIG. 4a while the first and the third phase 26, 28 are controlled with a voltage inverted in respect of these values to generate a known field angle that is modified in comparison to the one used in the first activation (step 105) (for example with the described 120° activation). The resulting current path I of the last three periods tm is once more detected. After spectral analysis, the second harmonic I2 is again divided by the third power of the fundamental wave I1 to determine the second point P2. By means of the incremental encoder signal 30, the incremental encoder angle β2 is now likewise available at the time of the second measurement (step 111).

Figure 3:
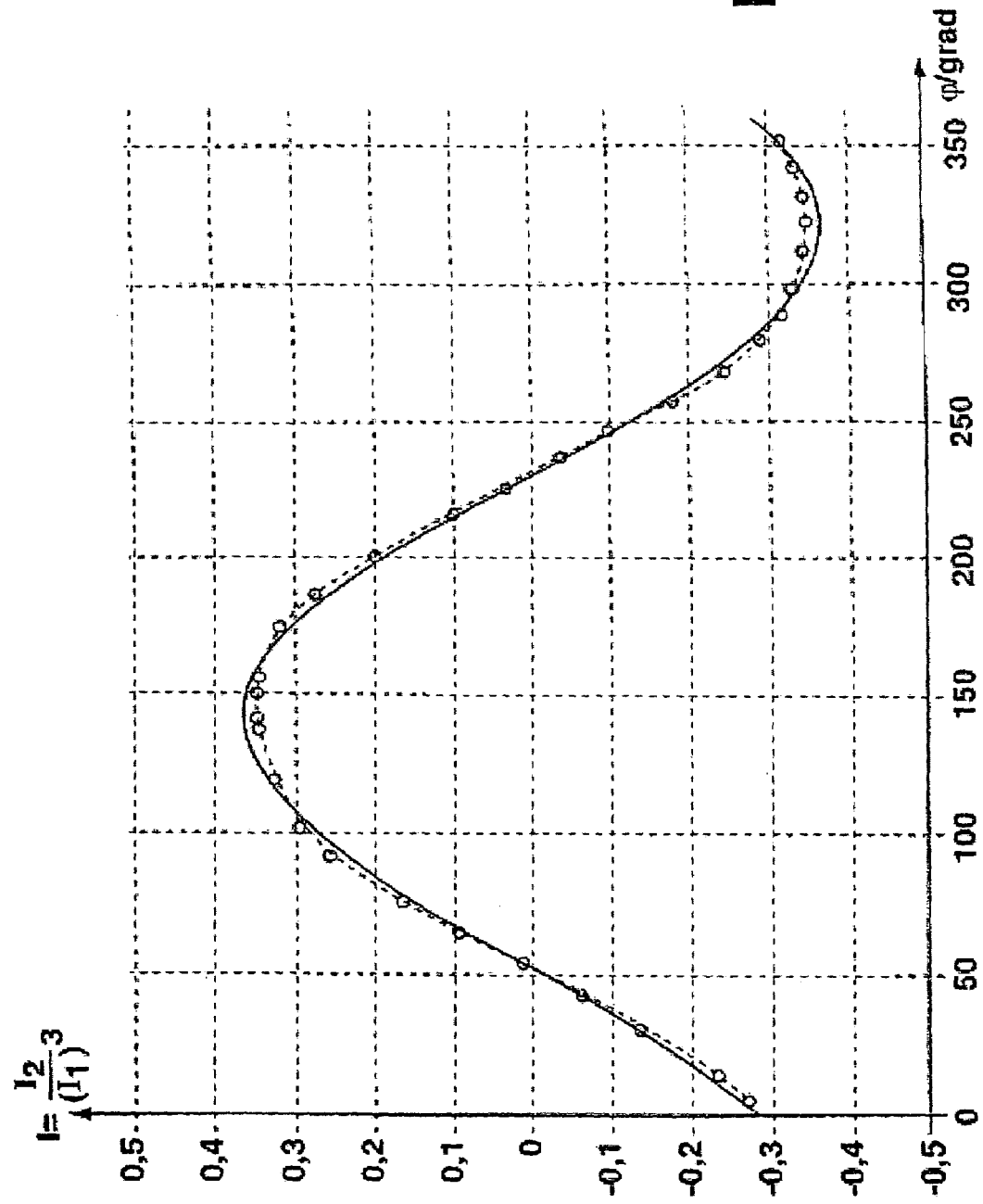
FIG. 3 shows the path of the first harmonic wave, divided by the third power of the fundamental wave in dependency on the electrical rotor angle according to the example embodiment, in each case compared to a reference sinus curve.

In the following evaluation according to step 103, the electrical starting rotor angle δ is now to be determined. From the first measurement (step 107), the first point P1 and the first incremental encoder angle β1 are known, and from the second measurement (step 111), the second point P2 and the second incremental encoder angle β2. Furthermore, it is approximately known that the electrical rotor angle 9 takes a sinusoidal form. This is shown for example in FIG. 3. Here, different ratios of the first harmonic I2 have been divided by the third power of the fundamental wave I1, applied in dependence on the electrical rotor angle φ the first point P1 and the first incremental encoder angle β1. Compared to the computation according to the state of the art (FIG. 2), a significantly improved sinusoidal form is evident in which only the second harmonic I2 has been used as a measure for the electrical angle φ. The electrical starting rotor angle δ can now be determined numerically by way of the following system of equations:

$$\delta = \arctan\frac{b}{a}$$

$$P1 = a\cdot\sin\beta1 + b\cdot\cos\beta1$$

$$P2 = a\cdot\sin(\beta2-120°) + b\cdot\cos(\beta2-120°),$$

with $P1=(I21):(I11)^3$, $P2=(I22):(I12)^3$, I11 being the fundamental wave of the current path i from the first measurement (step 107), I21 being the second harmonic of current path i from the first measurement (step 107), I12 the fundamental wave of current path i from the second measurement (step 111), and I22 being the second harmonic of current path i from the second measurement (step 111).

The above system of equations with three unknown factors and three equations renders an unambiguous solution. With the—now—known electrical starting rotor angle δ, selective activation of the motor 10 in consideration of the desired starting direction is possible.

In an alternative embodiment, it is suggested to perform a third activation with respective detection in addition to the activations and measurements of steps 105, 107, 109, and 111. In the third activation, the motor 10 is activated at an offset of another 120°, i.e. the third phase 28 is subjected to a sinusoidal voltage as shown for example in FIG. 4*a*, while the first and second phase 24, 26 are subjected to a voltage inverted to the former. Following that, the resulting current path as well as the output signal of the incremental encoder 12, β3 is detected in the third phase 28. In the same way as described above, the third point P3 is determined from the ratio of the first harmonic I2, divided by the third power of the harmonic wave I1. Now, three points P1 P2, P3 are available which should be approximately on a sinus curve. Using the three points as well as the three incremental encoder signals β1, β2 and β3, this sinus curve is now determined, for example according to the method of the least squares. From this, the starting rotor angle δ is defined.

The curve shape of the excitation voltage must not necessarily be sinusoidal; a periodic oscillation is sufficient to determine the fundamental wave and the first harmonic of the detected measured variable.

What is claimed is:

1. A method for determining an electrical stating rotor angle of an electric motor, comprising the following steps:
   using a periodic electrical quantity, whereupon the electric motor (10) is subjected to said periodic electrical quantity;
   detecting a corresponding path of a first measured variable (i); and
   determining a ratio (P1, P2) of a measure of a fundamental wave (I1) and a measure of a first harmonic wave (I2) from a spectrum of a curve of the measured variable (i).

2. A method according to claim 1, wherein the electrical quantity (U) to which the electric motor (10) is subjected is defined depending on at least one motor-specific parameter (IN, L, r).

3. A method according to claim 1, wherein the electrical quantity is a voltage (U) and the measured variable is a current (i), and wherein the measured variable is detected twice.

4. A method according to claim 3, wherein for determination of the electrical starting rotor angle (δ), the first harmonic (I2) is divided by the third power of the fundamental wave (I2).

5. A method according to claim 3, wherein with an approximately sinusoidal voltage (U), the amplitude (Û), and the starting phase angle (δ) are determined depending on at least one motor-specific parameter (IN, L, r).

6. A method according to claim 1, wherein the electric motor (10), for an adjustable period of time, is subjected to a periodic electrical quantity (U), the measured variable (i) being detected in a smaller measuring interval ™ than the period of activation.

7. A device for determination of an electrical starting rotor angle of an electric motor, comprising a signal acquisition and evaluation unit (18) which generates an activation signal for an inverter (20), wherein said acquisition and evaluation unit is supplied with at least one output signal (32, 34) of at least one sensor (14, 16), wherein the acquisition and evaluation unit determines, for the purpose of determining the electrical starting rotor angle (δ), at least the first harmonic wave (I2) from a detected measured variable (i), and wherein the acquisition and evaluation unit (18) also determines the fundamental wave (I1) of the measured variable (i).

8. A device according to claim 7, wherein an evaluation device (18) is provided which, from at least one motor parameter (IN, L, r), determines at least one amplitude (Û) and/or one starting phase angle (δ) of an electrical quantity (U) with which the electric motor (10) is driven.

9. A device according to claim 7, wherein the evaluation unit (18) evaluates a signal by an incremental encoder (30) to take into consideration any interim motion of the motor (10) when determining the electrical stating rotor angle (δ).

* * * * *